(12) United States Patent
Park et al.

(10) Patent No.: US 8,982,859 B2
(45) Date of Patent: Mar. 17, 2015

(54) WIRELESS DEVICE AND METHOD OF SHORT MAC FRAME INDICATION

(71) Applicant: Intel Corporation, Santa Clara, CA (US)

(72) Inventors: Minyoung Park, Portland, OR (US); Adrian P Stephens, Cottenham (GB); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/713,912

(22) Filed: Dec. 13, 2012

(65) Prior Publication Data

US 2013/0343185 A1 Dec. 26, 2013

Related U.S. Application Data (60) Provisional application No. 61/661,914, filed on Jun. 20, 2012.

(51) Int. Cl.
*H04W 4/00* (2009.01)
*H04J 3/24* (2006.01)
*H04W 28/06* (2009.01)
*H04W 84/12* (2009.01)

(52) U.S. Cl.
CPC ............ *H04W 28/065* (2013.01); *H04W 28/06* (2013.01); *H04W 84/12* (2013.01)
USPC .......................................... 370/338; 370/349

(58) Field of Classification Search
USPC .................................. 370/338, 328, 349, 393
See application file for complete search history.

(56) References Cited

U.S. PATENT DOCUMENTS

| | | | |
|---|---|---|---|
| 8,737,421 B2 * | 5/2014 | Zhang et al. ................... 370/437 |
| 2005/0111369 A1 * | 5/2005 | Mangin et al. ............. 370/236.1 |
| 2006/0056443 A1 | 3/2006 | Tao et al. |
| 2009/0141723 A1 | 6/2009 | Giesberts et al. |
| 2010/0246600 A1 * | 9/2010 | Das et al. ...................... 370/465 |
| 2012/0314696 A1 * | 12/2012 | Liu ............................... 370/338 |
| 2013/0034075 A1 * | 2/2013 | Zang et al. ..................... 370/329 |
| 2013/0128809 A1 * | 5/2013 | Wentink et al. ................ 370/328 |
| 2013/0294431 A1 * | 11/2013 | Wang et al. ................... 370/338 |
| 2013/0336182 A1 * | 12/2013 | Asterjadhi et al. ............ 370/310 |

FOREIGN PATENT DOCUMENTS

WO  WO-2013192333 A1  12/2013

OTHER PUBLICATIONS

"International ApplicationSerial No. PCT/US2013/046626, International Search Report mailed Sep. 27, 2013", 3 pgs.
"International Application Serial No. PCT/US2013/046626, Written Opinion mailed Sep. 27, 2013", 6 pgs.

(Continued)

*Primary Examiner* — Andrew Lee
(74) *Attorney, Agent, or Firm* — Schwegman Lundberg & Woessner, P.A.; Paul G. Kegley (57) ABSTRACT

Embodiments of a wireless communication device and method for short frame indication in an IEEE 802.11ah network are generally described herein. In some embodiments, a reserved bit in a service field is used to indicate whether a frame is using a short MAC header or a regular MAC header.

14 Claims, 6 Drawing Sheets

(56) References Cited

OTHER PUBLICATIONS

Minyoung, Park, "Proposed Specification Framework for TGah", IEEE 802.11-11/1137r69, [Online]. Retrieved from Internet: <URL: https://mentor.ieee.org/802.ll/dcn/ll/ll-1137-09-00ah-specificationframework-for-tgah.docx>, (May 17, 2012).

Simone, Merlin, "MAC Header Compression". IEEE 802.11-12/0646r0), [Online]. Retrieved from the Internet: <URL: https://mentor.ieee.org/802.11/dcn/12/ll-12-0646-00-00ah-comkpresseduacheader.pptx>, (May 17, 2012).

* cited by examiner

WIRELESS DEVICE AND METHOD OF SHORT MAC FRAME INDICATION

CLAIM OF PRIORITY AND RELATED APPLICATIONS

This application claims the benefit of priority under 35 U.S.C. 119(e) to Park et al., U.S. Provisional Patent Application Ser. No. 61/661,914, entitled, "WIRELESS DEVICE AND METHOD OF SHORT MAC FRAME INDICATION USING THE SERVICE FIELD", filed Jun. 20, 2012, hereby incorporated by reference herein in its entirety.

TECHNICAL FIELD

Examples pertain to wireless communications. Some embodiments relate to wireless communications in accordance with Institute of Electrical and Electronics Engineers (IEEE) 802.11ah amendment to the IEEE 802.11-2012 standard. Some examples relate to MAC header compression, service field, and short frame indication. Some examples relate to a short MAC frame indication using a Service field in IEEE 802.11ah. Some examples relate to sensor nodes and low-power consumption devices.

BACKGROUND

IEEE 802.11ah is designed to increase transmission range and operate in the sub 1 GHz bands. Today, the lowest physical layer (PHY) rate of 802.11n is 6.5 Mbps. If we assume 1 MHz channel bandwidth for 802.11ah, the lowest data rate is approximately 6.5 Mbps/20=325 Kbps.

DESCRIPTION

An 802.11ah network and network components can provide a very low power network and interface conducive for providing a wireless communication network for wireless capable things such as sensors. In certain examples, 802.11ah sensor applications can include sensors that can have small payload data sizes such as payload sizes of less than 100 octets. The present inventors have recognized that in addition to the small payload sizes, increased efficiencies of the network can be realized if the packet transmissions can be further reduced in size. In certain examples, a device, such as a device including a wireless communication module capable of operating on a 802.11ah wireless network, can communicate on the 802.11ah network using small, or compressed, media access control (MAC) headers.

It can be desirable to have short packet transmissions when using such low data rates. Given that most sensor applications have a payload size of less than 100 octets, a short MAC header can achieve significant communication efficiency.

Figure 1:
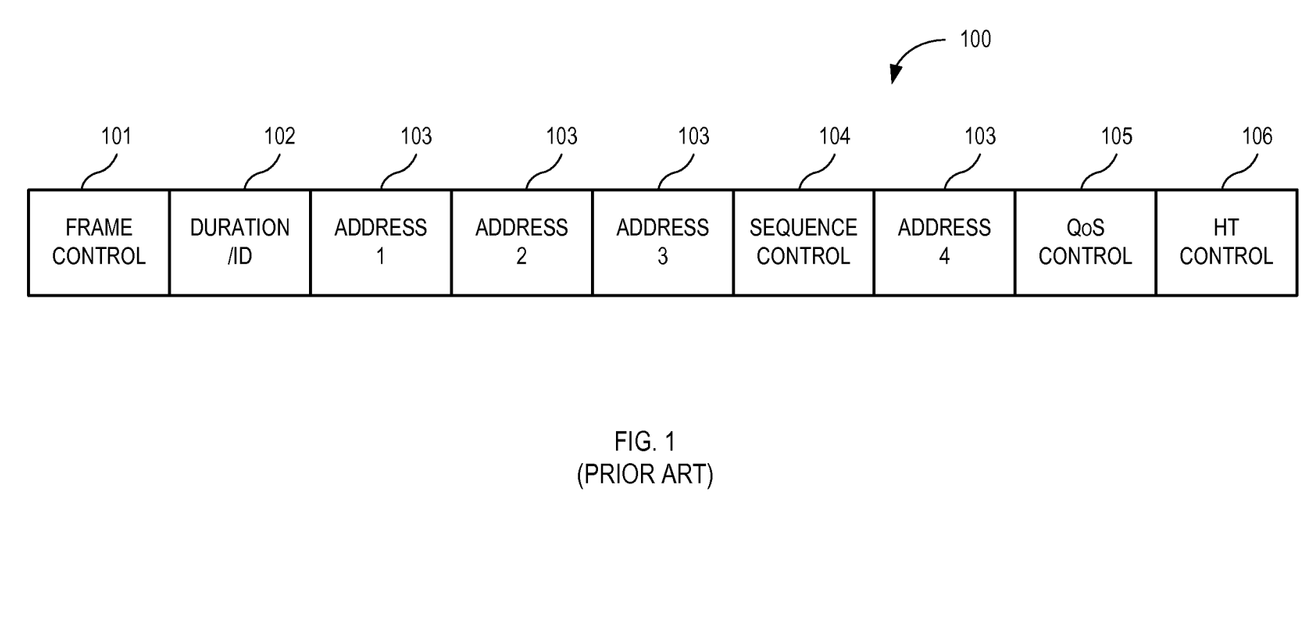
FIG. 1 illustrates a regular MAC header format known in the art.

FIG. 1 illustrates a regular MAC header format 100 known in the art. The regular MAC header format 100 includes fields of various length that provide frame control information 101, duration information 102, address information 103, optional sequence control information 104, optional quality of service (QoS) control information 105, and optional high throughput (HT) control information 106. The MAC frame format is discussed in section eight of the IEEE Std. 802.11™-2012 hereby incorporated by reference herein.

Figure 2:
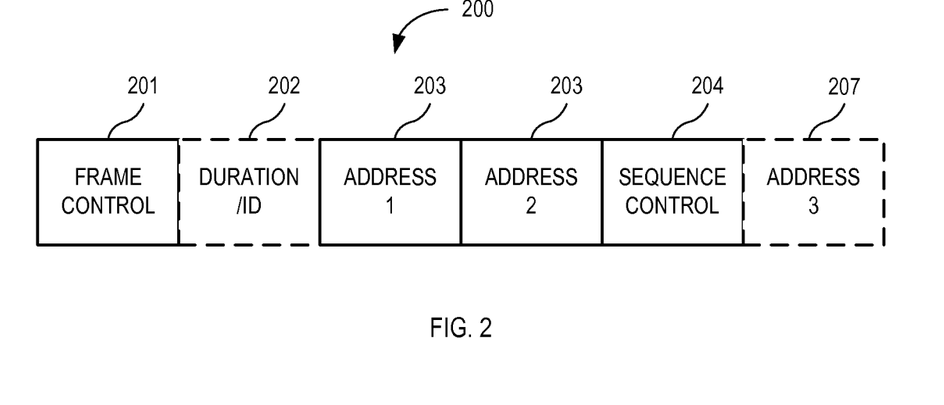
FIG. 2 illustrates generally an example short MAC header format in accordance with some embodiments.

FIG. 2 illustrates generally an example short MAC header format 200 in accordance with some embodiments. In certain examples, a short MAC header format 200 can include fields of various length that provide frame control information 201, address information 203, and optional sequence control information 204. In certain examples, address information can include two address fields 203. In some examples, a third address field 207 can be part of a short MAC header format 200.

In certain examples, management frames, control frames and data frames using the shorter MAC header can be differentiated from "regular" MAC headers. In certain examples, a short MAC header format 200 can be differentiated from a regular MAC header format using a service field common to both formats. In some examples, a bit in the service field can be used to indicate whether a frame is using the "short" MAC header or the "regular" MAC header. Such an implementation can enable IEEE 802.11ah compliant devices to use the existing frame types and subtypes for a frame with a short MAC header. In certain examples, a short MAC header format does not include at least one of a Duration/ID field 202, Quality of Signal (QoS) control field (not shown), or high throughput (HT) control field (not shown).

Figure 3:
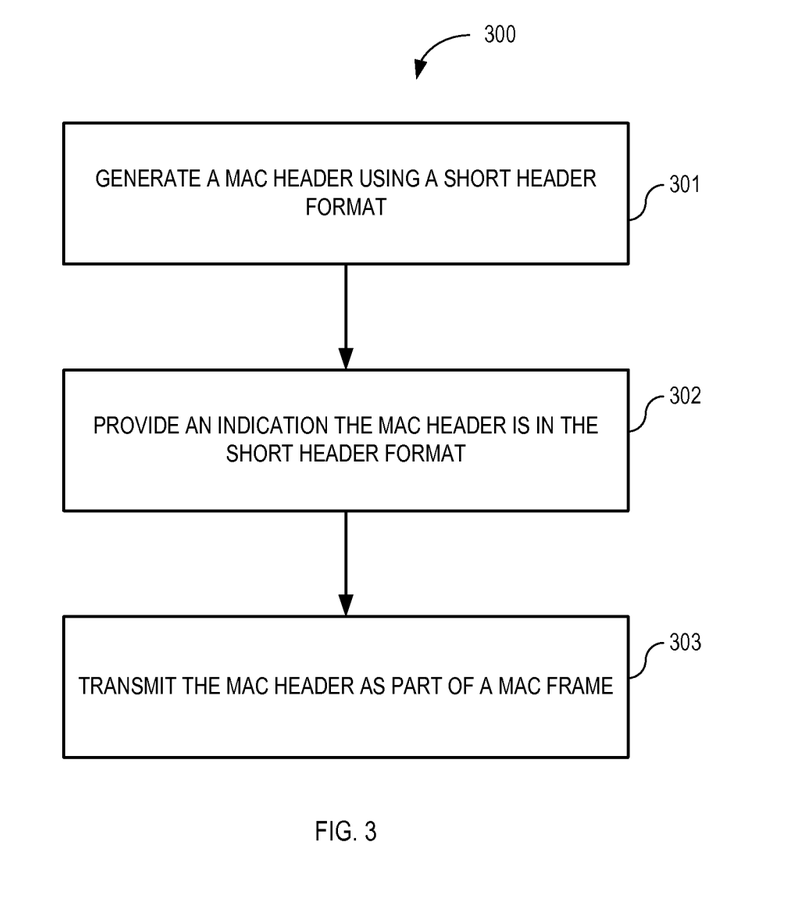
FIG. 3 illustrates generally a flowchart of an example method of using a short MAC header format with a IEEE 802.11ah network in accordance with some embodiments.

FIG. 3 illustrates generally a flowchart of an example method of using a short MAC header format with a IEEE 802.11ah network in accordance with some embodiments. At 301, the method can include generating a MAC header using a short header format. In a example, the MAC header does not include a Duration/ID field. In an example, the MAC heard does not include a QoS field. In an example, The MAC header does not include an HT field. In an example, The MAC header does not include more than two address fields. AT 302, the method can include providing an indication the MAC header is in a short header format. In certain examples, providing the indication can include adjusting a service field of a MAC frame. In some examples, providing the indication can include adjusting a service field of a physical layer convergence procedure (PLCP) header. In an example, providing the indication can include adjusting a bit of the service field. At 303, the method can include transmitting a MAC frame including the MAC header.

Figure 4:
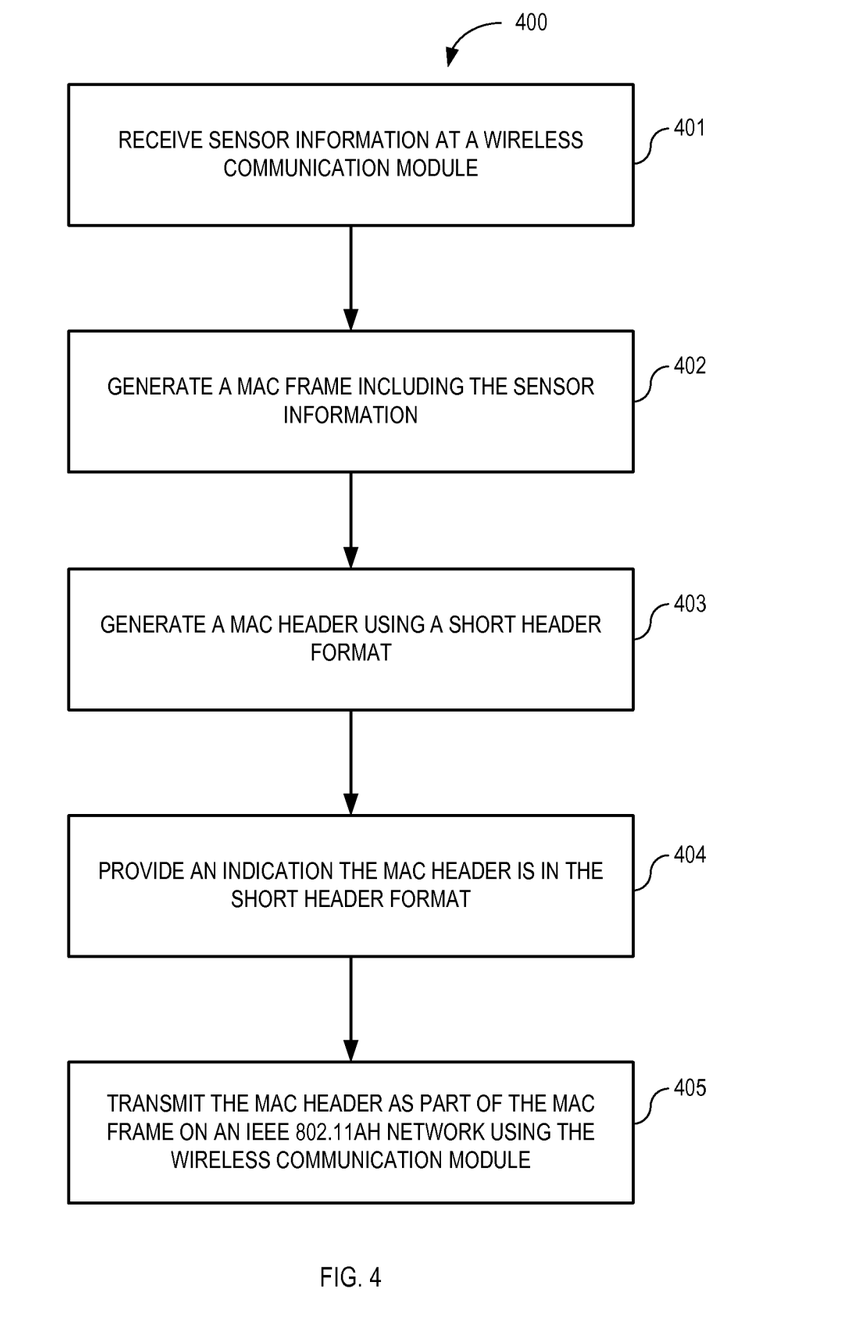
FIG. 4 illustrates generally a flowchart of an example method of sensor communication over a 802.11ah network using a short MAC header format in accordance with some embodiments.

Using a short MAC header can provide more efficient transmission of information over an IEEE 802.11ah network. This can be especially advantageous for devices that routinely communicate relatively smaller data payloads. Such devices can include sensors configured to communicate over a 802.11 network. FIG. 4 illustrates generally an example method of sensor communication over a 802.11ah network using a short MAC header format in accordance with some embodiments.

In certain examples, a sensor can be part of a network used to collect information for reporting, or for controlling other devices associated with the network. In some examples, the network can be a local network such as a local network at an office or home. In some examples, the network can include a neighborhood network. In certain examples, sensors communicating over the 802.11ah network can include sensors configured as part of a smart grid for a home or a neighborhood, such as sensors monitoring utilities such as water, gas or electricity.

In certain examples, the method 400 can include, at 401, receiving sensor information at a wireless communication module of a station or an access point. In certain examples, the wireless communication module or housing can be mechanically coupled to the sensor. At 402, the method 400 can include generating a MAC frame including the sensor information. In certain examples, a wireless communication module of a device on the IEEE 802.11ah network can generate the MAC frame. At 403, the method 400 can include generating a MAC header. In certain examples, the MAC header can be generated using a short header format to improve communication efficiency on the IEEE 802.11ah network. At 404, the method 400 can include providing an indication that the MAC header is in a short header format. In certain examples, the indication can be used by a receiving device capable of processing MAC frames that include either a regular MAC header or a MAC header using a short header format. In certain examples, the wireless communication module can also provide MAC headers using a regular header format. In certain examples, a service field can be used to provide the indication that the MAC header is in a short header format.

Figure 5:
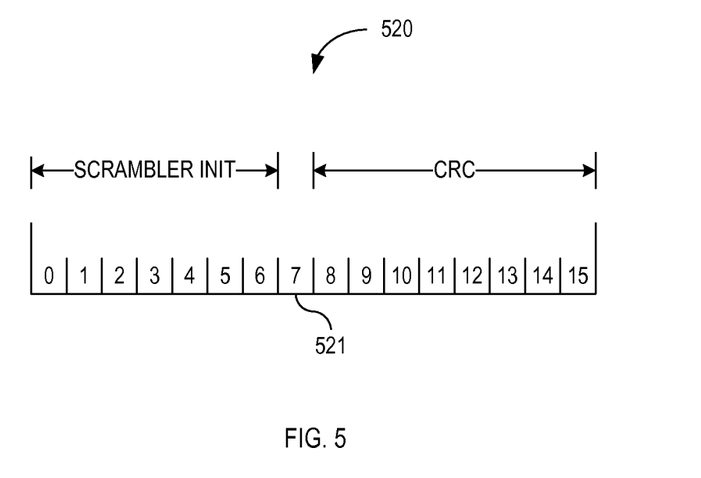
FIG. 5 illustrates generally a flowchart of an example method for communicating over a IEEE 802.11ah network in accordance with some embodiments.

In some examples, the service field can be part of a physical layer convergence procedure (PLCP) header. In some examples, a bit of the service field can be used to provide the indication that the MAC header is in a short header format. For example, the current IEEE 802.11-2012 standard defines the service field of the PLCP header. In that standard, the service field is 16 bits long and only 7 bits are being used to initialize a scrambler initialization. The rest of 9 bits are reserved for future use. The draft 802.11ac standard, or amendment, defines the PLCP header service field. The draft 802.11ac standard defines 8 bits of the reserved bits for CRC of VHT-SIG-B, thus bit 7 of the PLCP header service field, in an example, can be used to provide indication that the MAC header is in a short header format. FIG. 5 illustrates generally an example PLCP header service field 520 including a MAC format bit 521 for providing an indication of a MAC format, such as a short MAC format, in accordance with some embodiments.

Referring again to FIG. 4, the method 400, at 405, can include transmitting the MAC header as part of a MAC frame on an IEEE 802.11ah network using the wireless communication module. In certain examples, a MAC header in a short header format can be used for management frames, control frames, or data frames.

Figure 6:
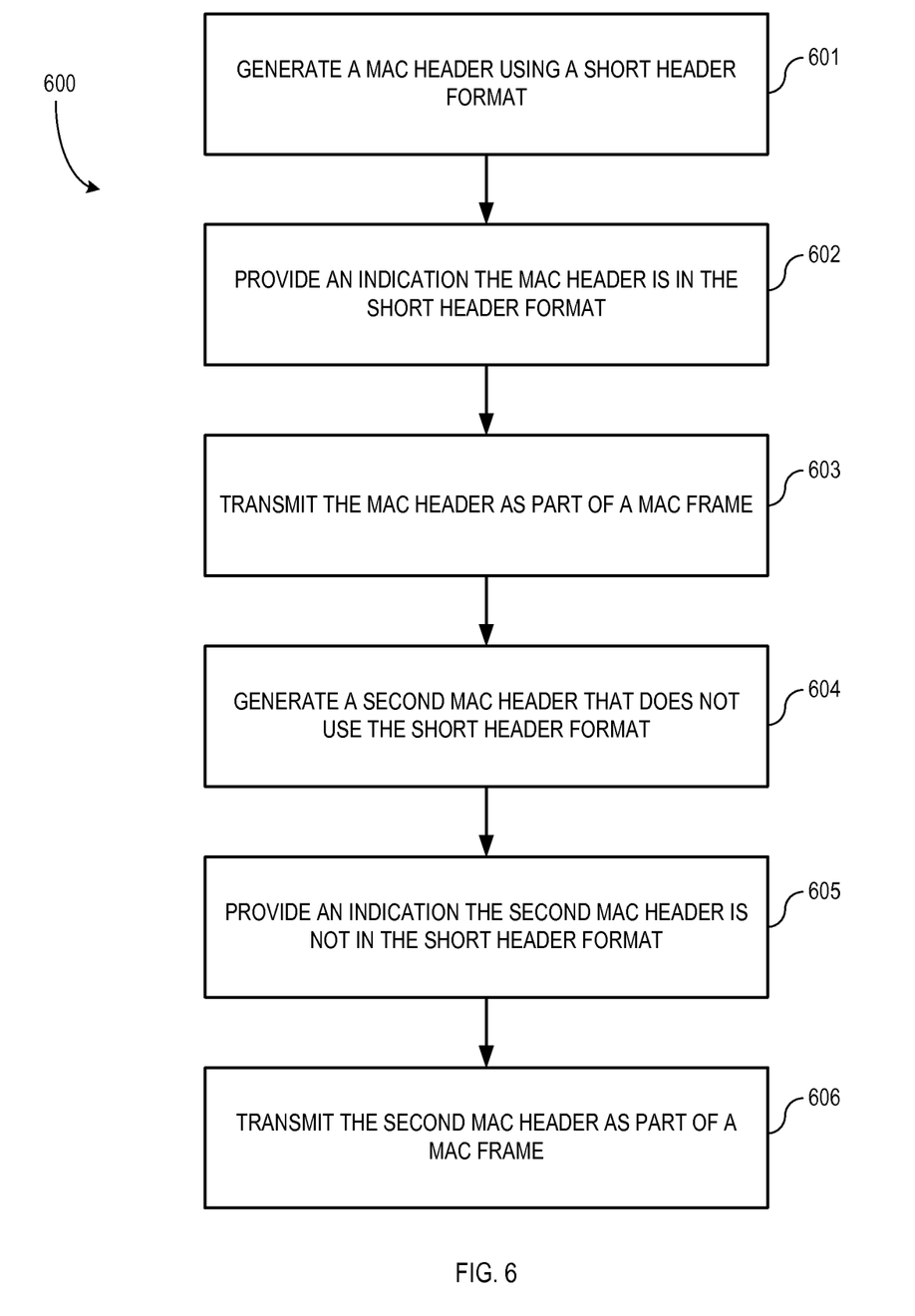
FIG. 6 illustrates generally a network system including an example IEEE 802.11ah network in accordance with some embodiments.

FIG. 6 illustrates generally an example method 600 for communicating over a IEEE 802.11ah network in accordance with some embodiments. The method 600 can include, at 601, generating a first MAC header using a short header format, at 602, providing an indication the first MAC header is in a short header format, at 603, transmitting the first MAC header as part of a MAC frame, at 604, generating a second MAC header that does not use the short header format, at 605, providing an indication the second MAC header is not in the short header format, and at 606, transmitting the second MAC header as part of a second MAC frame.

Figure 7:
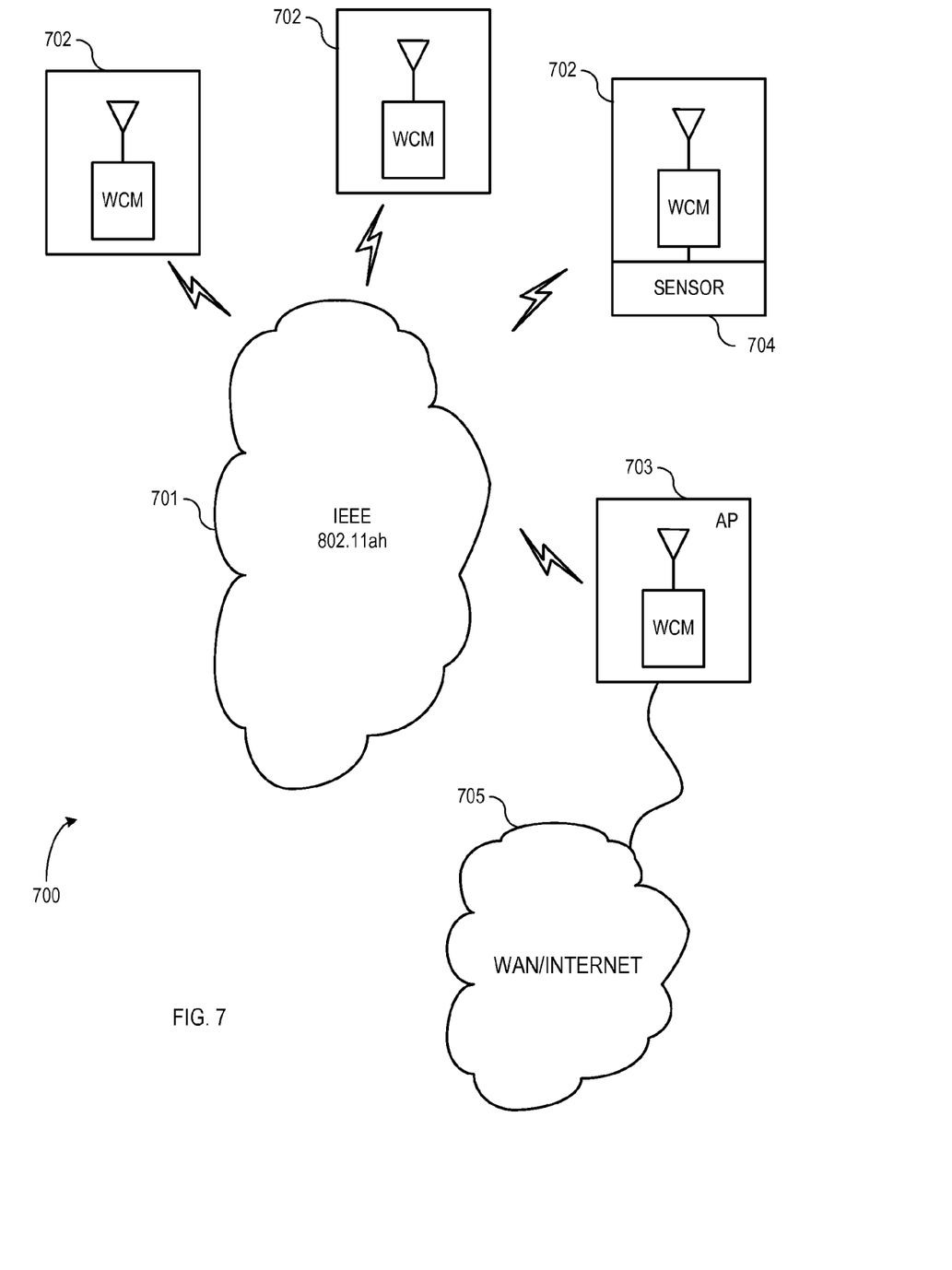
FIG. 7 illustrates a network system including an example IEEE 802.11ah network in accordance with some embodiments.

FIG. 7 illustrates a network system 700 including an example IEEE 802.11ah network 701 in accordance with some embodiments. In certain examples, the network IEEE 802.11ah network 701 can include one or more stations 702 or access points 703. In an example, a station 701 or access point 702 can include a wireless communication module (WCM), including a transceiver and associated circuitry including in certain examples an antenna. In certain examples, the wireless communication module can control device communications over the IEEE 802.11ah network 701. In certain examples, the wireless communication module (WCM) can include processing circuitry for generating or receiving MAC frames including MAC headers in a short header format. In certain examples, one or more wireless communication modules (WCM) can include processing circuitry for generating or receiving MAC headers in a regular format. In certain examples, one or more wireless communication modules (WCM) can be associated with a sensor 704 and can communicate sensor information over the IEEE 802.11ah network 701. In certain examples, one or more access points 703 can communicatively couple the IEEE 802.11ah network 701 with a wide area network (WAN) 705 such as the Internet, or world wide web.

Some examples relate to devices configured in accordance with the IEEE 802.11ah standard and may reduce the overhead of transmitting frames at the lowest data rate. Some examples relate to the IEEE 802.11ah standard, or amendment. Some embodiments may relate to the building blocks of IEEE 802.11ah standard and may improve the efficiency of the protocol, which can enable small battery powered wireless devices (e.g. sensors) to use Wi-Fi (802.11) to connect to the Internet with very low power consumption.

NOTES AND EXAMPLES

In Example 1, a method can include generating a media access control (MAC) header and providing an indication the MAC header is in a short header format. The generating the MAC header can include generating a frame control field, an address field and a sequence control field, and refraining from including at least one of a Duration/ID field, Quality of Signal Control (QoS) field, or high throughput (HT) Control field.

In Example 2, the providing an indication of Example 1 optionally includes providing the indication the MAC header is in a short header format using a service field of a physical layer convergence procedure (PLCP) header to provide the indication the MAC header is in the short header format.

In Example 3, the using a service field of any one or more of Examples 1-2 optionally includes using a single bit of the service field of the PLCP header.

In Example 4, the service field of any one or more of Examples 1-3 optionally includes sixteen bits in which bits zero through six (B0-B6) are used for scrambler initialization and bits eight through fifteen (B8-B15) are used for a cyclic-redundancy-check (CRC), and wherein bit seven (B7) is a reserved bit to indicate whether the frame is using the short header format or a regular header format.

In Example 5, the method of any one or more of Examples 1-4 optionally includes wirelessly transmitting the indication and a MAC frame including the MAC header using an Institute of Electrical and Electronics Engineers (IEEE) 802.11ah network.

In Example 6, the method of any one of more of Examples 1-5 optionally including receiving sensor information at the wireless communication module. The transmitting the MAC frame of any one or more of Examples 1-5 optionally includes transmitting the sensor information in the MAC frame, and the transmitting the sensor information of any one or more of Examples 1-5 optionally includes generating the MAC frame with about 100 octets or less of the sensor information.

In Example 7, the method of any one or more of Examples 1-6 optionally includes generating a second MAC header, providing an indication the MAC header is not in the short header format, and transmitting a second MAC frame including the second MAC header on an IEEE 802.11ah network using a wireless communication module.

In Example 8, a method can include receiving a first media access control (MAC) frame over an Institute of Electrical and Electronics Engineers (IEEE) 802.11ah network at a wireless communication module, determining whether a MAC header of the first MAC frame is in a short header format using a service field of a physical layer convergence procedure (PLCP) header, and processing information in the first MAC frame using format information in the MAC header, wherein the MAC header does not include at least one of a Duration/ID field, Quality of Signal Control (QoS) field, or high throughput (HT) Control field.

In Example 9, the determining a service field of a physical layer convergence procedure (PLCP) header indicates the MAC header of the first MAC frame is in the short header format of any one or more of Examples 1-8 optionally includes determining a single bit of the service field of the PLCP header indicates the MAC header of the first MAC frame is in the short header format.

In Example 10, the method of any one or more of claims 1-9 optionally includes generating a second MAC header, providing an indication the second MAC header is in a short header format, transmitting a second MAC frame including the second MAC header on the IEEE 802.11ah network using the wireless communication module.

In Example 11, the method of any one or more of Examples 1-10 optionally includes generating a second MAC header, providing an indication the second MAC header is not in a short header format, transmitting a second MAC frame including the second MAC header on the IEEE 802.11ah network using the wireless communication module.

In Example 12, an apparatus can include a wireless communication module configured to communicate over an Institute of Electrical and Electronics Engineers (IEEE) 802.11ah network, wherein the wireless communication module is configured to generate a media access control (MAC) header, to provide an indication the MAC header is in a short header format, and to transmit a MAC frame including the MAC header on the IEEE 802.11ah network. In certain examples, the MAC optionally includes a frame control field, an address field and a sequence control field, and does not include at least one of a Duration/ID field, Quality of Signal Control (QoS) field, or high throughput (HT) Control field, In Example 13, the wireless communication module of any one or more of Examples 1-12 optionally is configured to use a service field of a physical layer convergence procedure (PLCP) header to provide the indication the MAC header is in the short header format.

In Example 14, the wireless communication module of any one or more of Examples 1-13 optionally is configured to use a single bit of a service field of a physical layer convergence procedure (PLCP) header to provide the indication the MAC header is in the short header format.

In Example 15, the apparatus of any one or more of Examples 1-14 optionally includes a sensor configured to provide sensor information to the wireless communication module.

In Example 16, the MAC frame of any one or more of Examples 1-15 optionally includes the sensor information.

In Example 17, the wireless communication module of any one or more of Examples 1-16 optionally is configured generate a second MAC header, to provide an indication the second MAC header is not in the short header format, and to transmit a second MAC frame including the second MAC header on the IEEE 802.11ah network.

In Example 18, an apparatus can include a wireless communication module configured to communicate over an Institute of Electrical and Electronics Engineers (IEEE) 802.11ah network. The wireless communication module can be configured to receive a frame including a media access control (MAC) header over the IEEE 802.11ah network, to determine a service field of a physical layer convergence procedure (PLCP) header indicates the MAC header of the first MAC frame is in the short header format, and to process information in the frame using format information in the MAC header, wherein the MAC includes a frame control field, an address field and a sequence control field, and wherein the MAC header does not include at least one of a Duration/ID field, Quality of Signal Control (QoS) field, or high throughput (HT) Control field.

In Example 19, the wireless communication module of any one or more of Examples 1-18 optionally is configured to evaluate a value of a single bit of the service field of the PLCP header to determine the MAC header of the first MAC frame is in the short header format.

In Example 20, the wireless communication module of any one or more of Examples 1-19 optionally is configured to generate a second MAC header, to provide an indication the second MAC header is in the short header format, and to transmit a second MAC frame including the second MAC header on the IEEE 802.11ah network.

In Example 21, the wireless communication module of any one or more of Examples 1-20 optionally is configured to generate a second MAC header, to provide an indication the second MAC header is not in the short header format, and to transmit a second MAC frame including the second MAC header on the IEEE 802.11ah network.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the functions of Examples 1 through 21.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The above detailed description includes references to the accompanying drawings, which form a part of the detailed description. The drawings show, by way of illustration, specific embodiments in which the subject matters can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, although the examples above may have been described relating to PNP devices, one or more examples can be applicable to NPN devices. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method performed by a wireless communication device, the method comprising:
generating a media access control (MAC) header; and
providing an indication the MAC header is in a short header format;
wherein generating the MAC header includes
generating a frame control field, an address field and a sequence control field, and
refraining from including at least one of a Duration/ID field, Quality of Signal Control (QoS) field, or high throughput (HT) Control field;
wherein providing an indication includes providing the indication the MAC header is in a short header format using a service field of a physical layer convergence procedure (PLCP) header to provide the indication the MAC header is in the short header format;
wherein the service field comprises sixteen bits in which bits zero through six (B0-B6) are used for scrambler initialization and bits eight through fifteen (B8-B15) are used for a cyclic-redundancy-check (CRC), and
wherein bit seven (B7) is a reserved bit to indicate whether the frame is using the short header format or a regular header format.

2. The method of claim 1, including wirelessly transmitting the indication and a MAC frame including the MAC header using an Institute of Electrical and Electronics Engineers (IEEE) 802.11ah network.

3. The method of claim 2, including receiving sensor information at the wireless communication module;
wherein transmitting the MAC frame includes transmitting the sensor information in the MAC frame, and
wherein transmitting the sensor information includes generating the MAC frame with about 100 octets or less of the sensor information.

4. The method of claim 1, including:
generating a second MAC header;
providing an indication the MAC header is not in the short header format; and
transmitting a second MAC frame including the second MAC header on an IEEE 802.11ah network using a wireless communication module.

5. A method comprising:
receiving a first media access control (MAC) frame over an Institute of Electrical and Electronics Engineers (IEEE) 802.11ah network at a wireless communication module;
determining whether a MAC header of the first MAC frame is in a short header format using a service field of a physical layer convergence procedure (PLCP) header; and
processing information in the first MAC frame using format information in the MAC header, wherein the MAC header does not include at least one of a Duration/ID field, Quality of Signal Control (QoS) field, or high throughput (HT) Control fields;
wherein the service field comprises sixteen bits in which bits zero through six (B0-B6) are used for scrambler initialization and bits eight through fifteen (B8-B15) are used for a cyclic-redundancy-check (CRC), and
wherein bit seven (B7) is a reserved bit to indicate whether the frame is using the short header format or a regular header format.

6. The method of claim 5, including
generating a second MAC header;
providing an indication the second MAC header is in a short header format; and
transmitting a second MAC frame including the second MAC header on the IEEE 802.11ah network using the wireless communication module.

7. The method of claim 5, including
generating a second MAC header;
providing an indication the second MAC header is not in a short header format; and
transmitting a second MAC frame including the second MAC header on the IEEE 802.11ah network using the wireless communication module.

8. An apparatus comprising:
a wireless communication module configured to communicate over an Institute of Electrical and Electronics Engineers (IEEE) 802.11ah network, wherein the wireless communication module is configured to,
generate a media access control (MAC) header;
provide an indication the MAC header is in a short header format, wherein the MAC includes a frame control field, an address field and a sequence control field, and wherein the MAC header does not include at least one of a Duration/ID field, Quality of Signal Control (QoS) field, or high throughput (HT) Control field; and transmit a MAC frame including the MAC header on the IEEE 802.11ah network;

wherein a service field of a physical layer convergence procedure (PLCP) header includes the indication the MAC header is in the short header format;

wherein the service field comprises sixteen bits in which bits zero through six (B0-B6) are used for scrambler initialization and bits eight through fifteen (B8-B15) are used for a cyclic-redundancy-check (CRC), and wherein bit seven (B7) is a reserved bit to indicate whether the frame is using the short header format or a regular header format.

9. The apparatus of claim 8, including a sensor configured to provide sensor information to the wireless communication module.

10. The apparatus of claim 9, wherein the MAC frame includes the sensor information.

11. The apparatus of claim 8, wherein the wireless communication module is configured generate a second MAC header, to provide an indication the second MAC header is not in the short header format, and to transmit a second MAC frame including the second MAC header on the IEEE 802.11ah network.

12. An apparatus comprising:

a wireless communication module configured to communicate over an Institute of Electrical and Electronics Engineers (IEEE) 802.11ah network, wherein the wireless communication module is configured to, receive a frame including a media access control (MAC) header over the IEEE 802.11ah network;

determine a service field of a physical layer convergence procedure (PLCP) header indicates the MAC header of the first MAC frame is in the short header format; and process information in the frame using format information in the MAC header, wherein the MAC includes a frame control field, an address field and a sequence control field, and wherein the MAC header does not include at least one of a Duration/ID field, Quality of Signal Control (QoS) field, or high throughput (FIT) Control field;

wherein the service field comprises sixteen bits in which bits zero through six (B0-B6) are used for scrambler initialization and bits eight through fifteen (B8-B15) are used for a cyclic-redundancy-check (CRC), and wherein bit seven (B7) is a reserved bit to indicate whether the frame is using the short header format or a regular header format.

13. The apparatus of claim 12, wherein the wireless communication module is configured to, generate a second MAC header;

provide an indication the second MAC header is in the short header format; and transmit a second MAC frame including the second MAC header on the IEEE 802.11ah network.

14. The apparatus of claim 12, wherein the wireless communication module is configured to, generate a second MAC header;

provide an indication the second MAC header is not in the short header format; and transmit a second MAC frame including the second MAC header on the IEEE 802.11ah network.

* * * * *